US009101202B2

(12) United States Patent
Nielsen

(10) Patent No.: US 9,101,202 B2
(45) Date of Patent: *Aug. 11, 2015

(54) STRAP LIFTER FOR USE BETWEEN TWO PERSONS

(71) Applicant: Corey David Nielsen, Denver, CO (US)

(72) Inventor: Corey David Nielsen, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 14/463,622

(22) Filed: Aug. 19, 2014

(65) Prior Publication Data

US 2014/0353348 A1 Dec. 4, 2014

Related U.S. Application Data

(63) Continuation of application No. 13/466,101, filed on May 7, 2012, now Pat. No. 8,807,403.

(60) Provisional application No. 61/483,650, filed on May 7, 2011.

(51) Int. Cl.
*B65G 7/12* (2006.01)
*A45F 3/14* (2006.01)

(52) U.S. Cl.
CPC ... *A45F 3/14* (2013.01); *B65G 7/12* (2013.01); *A45F 2003/142* (2013.01); *A45F 2003/146* (2013.01); *Y10T 24/4019* (2015.01); *Y10T 24/4084* (2015.01)

(58) Field of Classification Search
CPC ......... B65G 7/12; A45F 3/14; A45F 2003/14; A45F 2003/142; A45F 2003/146; A61G 7/1049; A61G 7/1051; A01M 31/006; Y10T 24/4019; Y10T 24/4084
USPC ............ 224/157, 184, 258, 904; 24/171, 196; 410/97, 100; 5/625–629; 294/152; 280/1.5, 18
See application file for complete search history.

(56) References Cited

U.S. PATENT DOCUMENTS

| 1,535,208 | A | | 4/1925 | Drennan | |
|---|---|---|---|---|---|
| 1,611,588 | A | * | 12/1926 | Hyde | .............................. 24/171 |
| 1,995,439 | A | | 3/1935 | Tompkins | |
| 2,099,387 | A | * | 11/1937 | Cohn et al. | ....................... 24/171 |
| 2,431,780 | A | | 12/1947 | Theal | |

(Continued)

OTHER PUBLICATIONS

Shoulder Dolly, Moving Straps—Easier Than a Moving Dolly, http://shoulderdolly.com/, available at least as early as Dec. 2, 2010, pp. 1-2.

(Continued)

*Primary Examiner* — Justin Larson
*Assistant Examiner* — Scott McNurlen
(74) *Attorney, Agent, or Firm* — Pedersen and Company, PLLC; Ken J. Pedersen; Barbara S. Pedersen

(57) ABSTRACT

A strap lifter for use with a harness is shown and described. The harness may have two shoulder straps that support a central, front buckle for use at about the lower, central belly of a user. A generally horizontal buckle strap has a fixed, rigid lower loop beneath a movable, flexible upper loop secured to the front of the buckle strap. The lower and upper loops are generally parallel, and close, to each other. Typically, the distance between the two loops is slightly more than the thickness of a lifter strap which is threaded between the two loops. Preferably, a set of two harnesses is used by two persons standing face-to-face with a single lifter strap between them threaded through both of the buckles.

28 Claims, 10 Drawing Sheets

(56) References Cited

U.S. PATENT DOCUMENTS

| | | | |
|---|---|---|---|
| 2,528,078 A | 10/1950 | Quilter | |
| 2,743,497 A * | 5/1956 | Davis | 24/196 |
| 3,293,713 A * | 12/1966 | Gaylord | 24/196 |
| 5,307,967 A | 5/1994 | Seals | |
| 5,497,923 A * | 3/1996 | Pearson et al. | 224/639 |
| 5,588,940 A | 12/1996 | Price et al. | |
| 6,213,365 B1 * | 4/2001 | Stocke et al. | 224/665 |
| 6,508,389 B1 | 1/2003 | Ripoyla et al. | |
| 6,641,008 B2 | 11/2003 | Falzone et al. | |
| 6,679,404 B2 * | 1/2004 | Brandt | 224/247 |
| 6,698,632 B1 * | 3/2004 | Turner et al. | 224/196 |
| 6,729,511 B2 | 5/2004 | Dent | |
| 7,331,493 B2 | 2/2008 | Dent | |
| 8,807,403 B2 | 8/2014 | Nielsen | |
| 2002/0148866 A1 | 10/2002 | Dent | |
| 2005/0263551 A1 | 12/2005 | Dent | |
| 2007/0187445 A1 | 8/2007 | Krapka | |

OTHER PUBLICATIONS

Shoulder Dolly, Products, http://shoulderdolly,com/products-2/, available at least as early as Dec. 2, 2010.

PCT International Search Report and the Written Opinion, Dec. 18, 2012, PCT/US2012/036855, Applicant: Nielsen.

* cited by examiner

STRAP LIFTER FOR USE BETWEEN TWO PERSONS

BACKGROUND OF THE DISCLOSED TECHNOLOGY

This application is a continuation of U.S. patent application Ser. No. 13/466,101, filed May 7, 2012, and issued on Aug. 19, 2014 as U.S. Pat. No. 8,807,403, which claims priority of provisional patent application Ser. No. 61/483,650, filed on May 7, 2011, entitled "Two Person Lifting System with Middle Strap," the disclosures of which are incorporated herein by reference.

FIELD OF THE DISCLOSED TECHNOLOGY

The disclosed technology relates generally to the delivery/moving/relocation businesses, and more specifically to a set of shoulder harnesses with buckles and central lifter strap for use between two persons to help lift heavy objects, like, for example, home appliances and furniture.

RELATED ART

U.S. Pat. No. 1,535,208 (Drennan) discloses a body lifter harness with a shoulder harness and a central buckle for securing the harness straps and supporting a central strap with a hook.

U.S. Pat. No. 2,431,780 (Theal) discloses a load carrying pair of straps connected by a central strap with a buckle, each load carrying strap being secured to a shoulder harness of a person.

U.S. Pat. No. 6,508,389 (Ripoyla et al.) discloses a harness for lifting. The harness having a bottom strap which is linked together with the bottom strap of another, identical harness at a cross-over point.

U.S. Pat. No. 6,641,008 (Falzone et al.) also discloses a shoulder strap harness lifter for two persons with a central strap being connected to each harness by the shoulder straps each being threaded through one of a series of openings in the central strap.

U.S. Pat. No. 6,729,511 (Dent '511) discloses a lifting harness for the shoulders of two persons with a wide, conventional central tension buckle and a web lift strap threaded through the buckle.

U.S. Pat. No. 7,331,493 (Dent '493) discloses a lifting harness similar to the one disclosed in Dent '511 above, except in Dent '493 the shoulder straps are threaded through holes in the central buckle, versus the shoulder straps having carabiners for supporting the central buckle in Dent '511. Dent '493, then, discloses a one-piece buckle that is loose on the webbed harness.

An embodiment similar to the disclosure of Dent '493 is marketed as the SHOULDER DOLLY® by Nielsen Products, LLC of Sandy, Utah, USA. (SHOULDER DOLLY® is a registered US trademark owned by TDT Moving Systems, Inc. of Colorado, USA.)

SUMMARY OF THE DISCLOSED TECHNOLOGY

Described is a strap lifter, preferably for use between two persons, to help lift heavy objects, like, for example, home appliances and furniture.

In one embodiment, the subject strap lifter has a pair of shoulder harnesses with central, front buckles, and a central lifter strap of strong nylon webbing which is threaded through the buckles for both straps. Preferably, each shoulder harness has a set of shoulder straps fashioned from a single length of strong nylon web. The single length of web starts at an "x" crossing for the high, center back of the user, and also terminates there. To make an embodiment of a harness, the ends of the single length of web are overlapped in end-to-end fashion, the overlapped ends are placed over the midpoint of the looped single length in perpendicular fashion, and all three layers are sewn together with a strong nylon thread to make an "x" crossing of the two shoulder straps. At a distance in the looped single length generally opposite the "x" crossing, a short buckle strap is sewn perpendicularly to the front of each shoulder strap. The buckle strap is a short length of strong nylon web which is overlapped and sewn at each end to the front of one of the shoulder straps. This way, the short buckle strap determines the spacing between the shoulder straps for the central, front buckle for use at about the lower, center belly of the user.

Besides the short buckle strap, the central, front buckle has an optional, generally horizontal reinforcing bar riveted perpendicularly to the back of each shoulder strap. Generally the reinforcing bar is located and secured so it is at about the center of the buckle strap, but on the opposite sides of the shoulder straps. The reinforcing bar helps make the central, front buckle more rigid and stronger, and better secured to the short buckle strap. On the front of the buckle strap, generally co-extensive with the reinforcing bar, is a fixed, rigid lower loop of the buckle. Conveniently, the rigid lower loop may be secured to the front of the buckle strap by the same rivets which secure the reinforcing bar to the back of the shoulder straps.

Also secured to the front of the buckle strap, just above and generally parallel to, the rigid lower loop, is a movable, flexible upper loop. Typically, the upper loop is spaced-apart from the lower loop a distance slightly greater than the thickness of the central lifter strap, for example, spaced-apart a distance about 5-100 percent greater (and more preferably about 20-60 percent greater) than the thickness of the central strap, when no load is applied to the central lifter strap. For example, the upper loop may be spaced-apart from the lower loop a distance of 3/16 inch for a central lifter strap about 1/8 inch thick, when no load is applied to the lifter strap. The middle part of the upper loop may be a horizontal cylinder made of nylon fabric which receives within it a reinforcing buckle. Or, the upper loop may exist as a flatter envelope which is flexible enough to accept the reinforcing rod. The ends of the upper loop, which are secured to the buckle strap near its side edges, respectively, are flexible so the upper loop is movable relative to the buckle strap and the fixed lower loop.

In use, one end of the central lifter strap is first threaded up through the rigid lower loop, passed up, over the top of, and partly around, the flexible upper loop, and back down and through the rigid lower loop, preferably in front of the first pass of the lifter strap through the rigid lower loop. This way, when no load is applied to the lifter strap, its length may be easily adjusted by the user by loosening the lifter strap's end up and over the flexible upper loop to un-do the buckle, and gently pushing and/or pulling on the lifter strap to adjust the length of it. After adjustment, when a load is applied to the lifter strap, the central part of the movable, flexible upper loop is pulled down and pinches the lifter strap on itself and on the upper, inside edge of the rigid lower loop. This way, the lifter strap is restrained in the buckle, and securely fixed for use in lifting heavy objects.

Preferably, two harnesses worn by two persons standing face-to-face are employed with one central lifter strap between them to place under and help lift heavy objects. However, one person with the harness can use the central lifter strap to secure large, ungainly loads that are still light enough to lift safely. Also, more than one lifter strap may be secured to one person when the harness for the person is fitted with several buckles. Also, the buckle may be effectively provided by a harness with an integrated buckle strap that is secured to a fixed point, like on a post or wall, and a lifter strap threaded through the buckle and operated by one or more persons not connected to the harness to pull or lift an object on the lifter strap.

BRIEF DESCRIPTION OF THE DRAWINGS

FIG. 9A is a side cross-sectional view along the line 9A-9A in FIG. 9.

DETAILED DESCRIPTION OF SEVERAL EMBODIMENTS OF THE DISCLOSED TECHNOLOGY

Referring to the Figures, there are shown several, but not all, embodiments of the disclosed technology.

Figure 1:
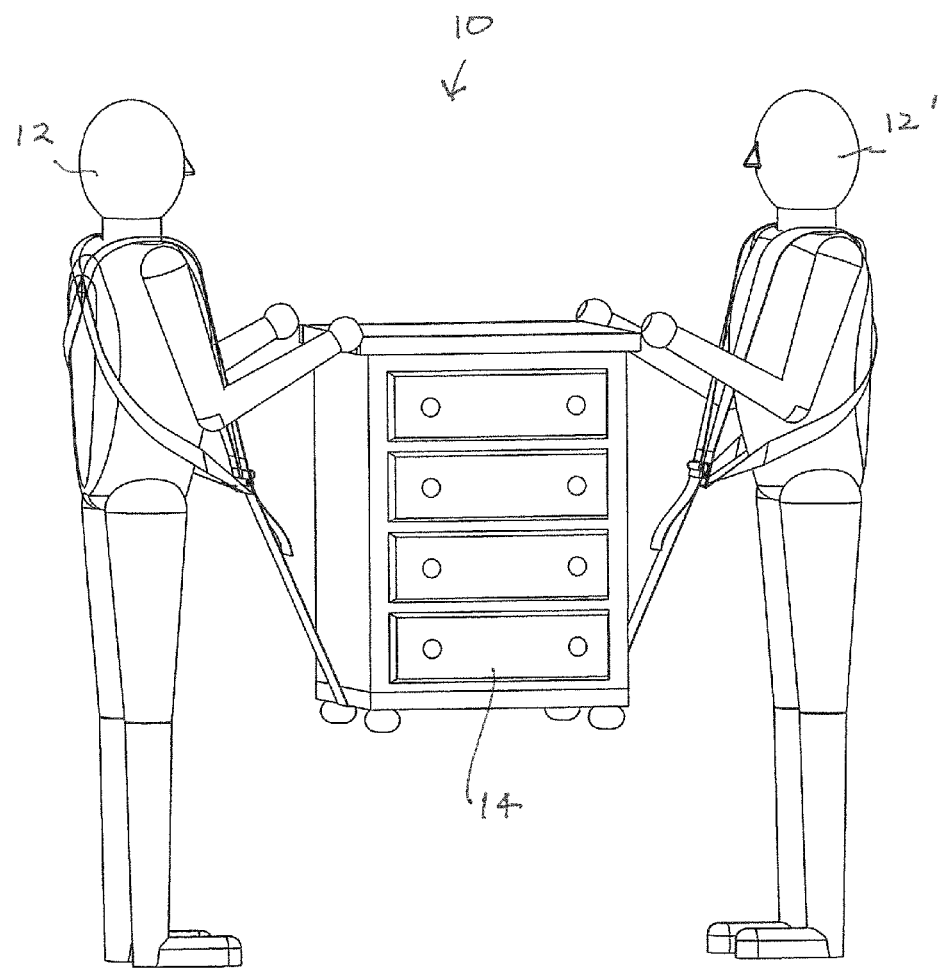
FIG. 1 is a side perspective view of one embodiment of the disclosed technology in use by two persons.

FIG. 1 shows one embodiment 10 of the disclosed technology in use by two persons 12 and 12' to help lift dresser 14.

Figure 2:
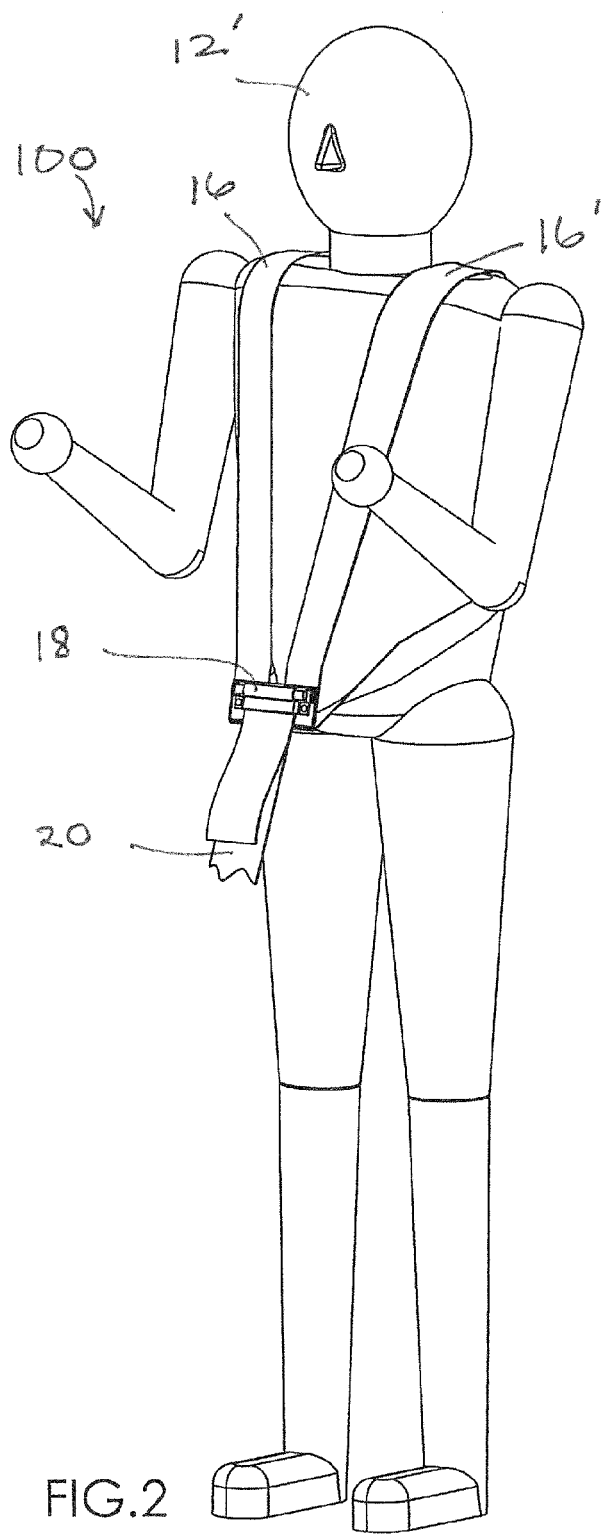
FIG. 2 is a schematic, front perspective view of another embodiment of the disclosed technology on a person, but showing only part of the central lifter strap.

FIG. 2 shows a front perspective view of another embodiment 100 of the disclosed technology on person 12', this embodiment 100 having shoulder straps 16 and 16' supporting central buckle 18 which has center strap 20 (shown in part) threaded through buckle 18.

Figure 3:
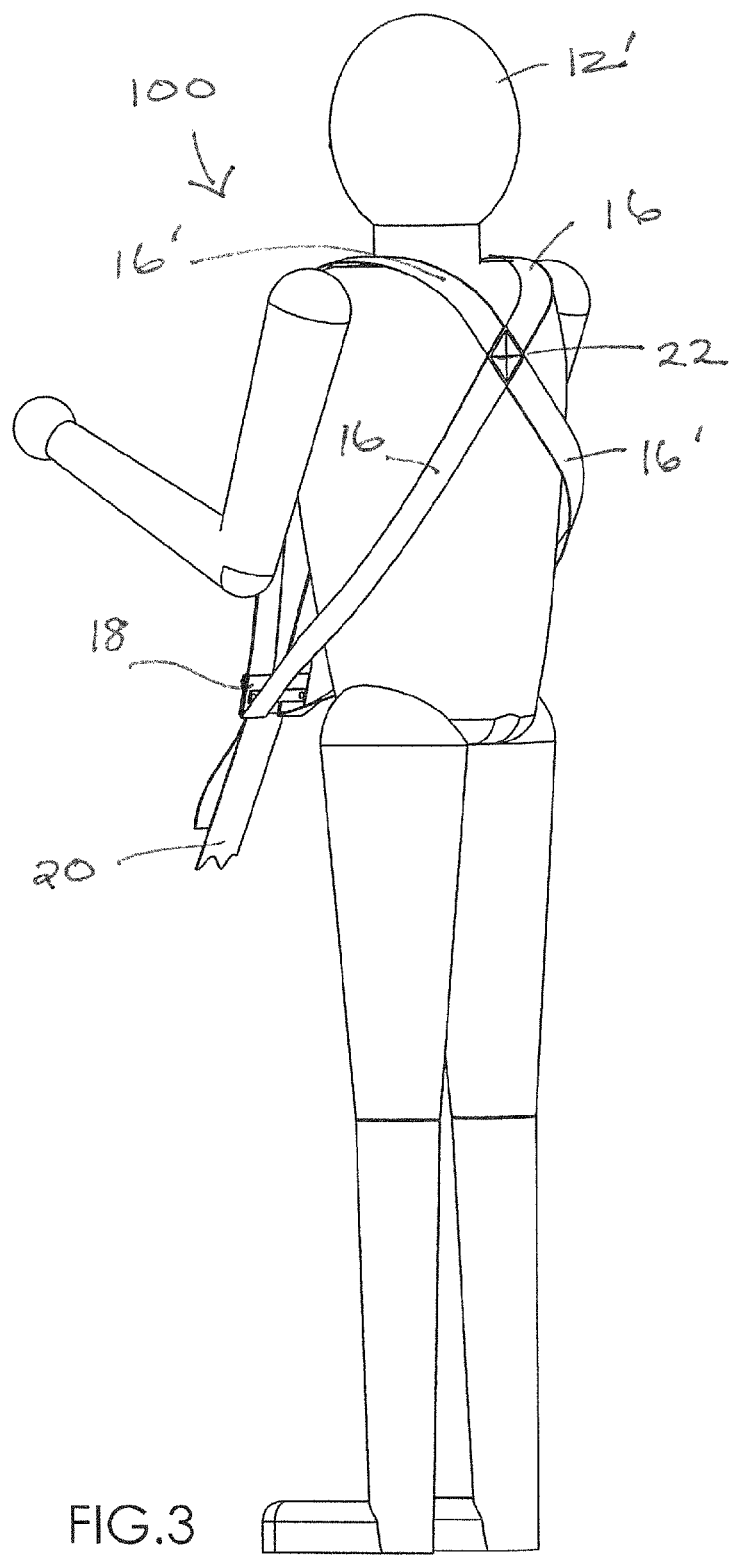
FIG. 3 is a rear perspective view of the embodiment depicted in FIG. 2.

FIG. 3 shows a rear view of FIG. 2. From this Figure it is clear that straps 16 and 16' cross in the back to make an "x" connection 22.

Figure 4:
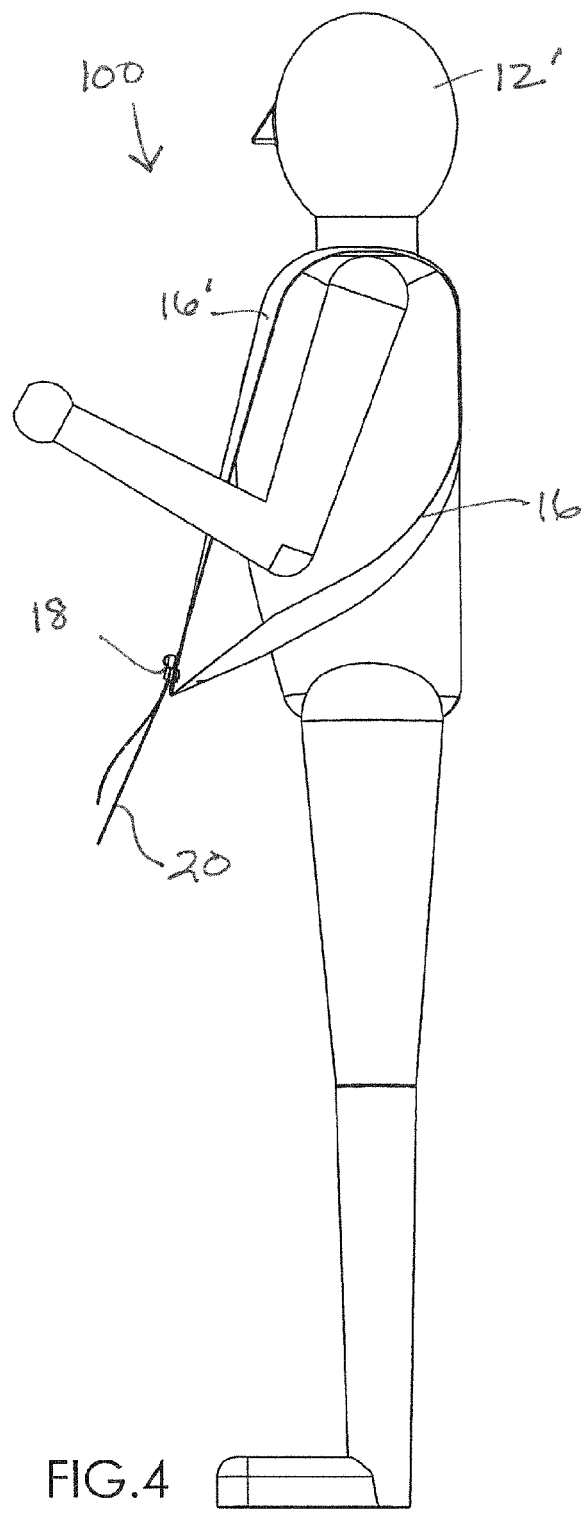
FIG. 4 is a side view of the embodiment depicted in FIGS. 2 and 3.

FIG. 4 shows a left side view of the embodiment 100 depicted in FIGS. 2 and 3. From this Figure it is clear that buckle 18 is employed at about the lower, center belly of the user.

Figure 5:
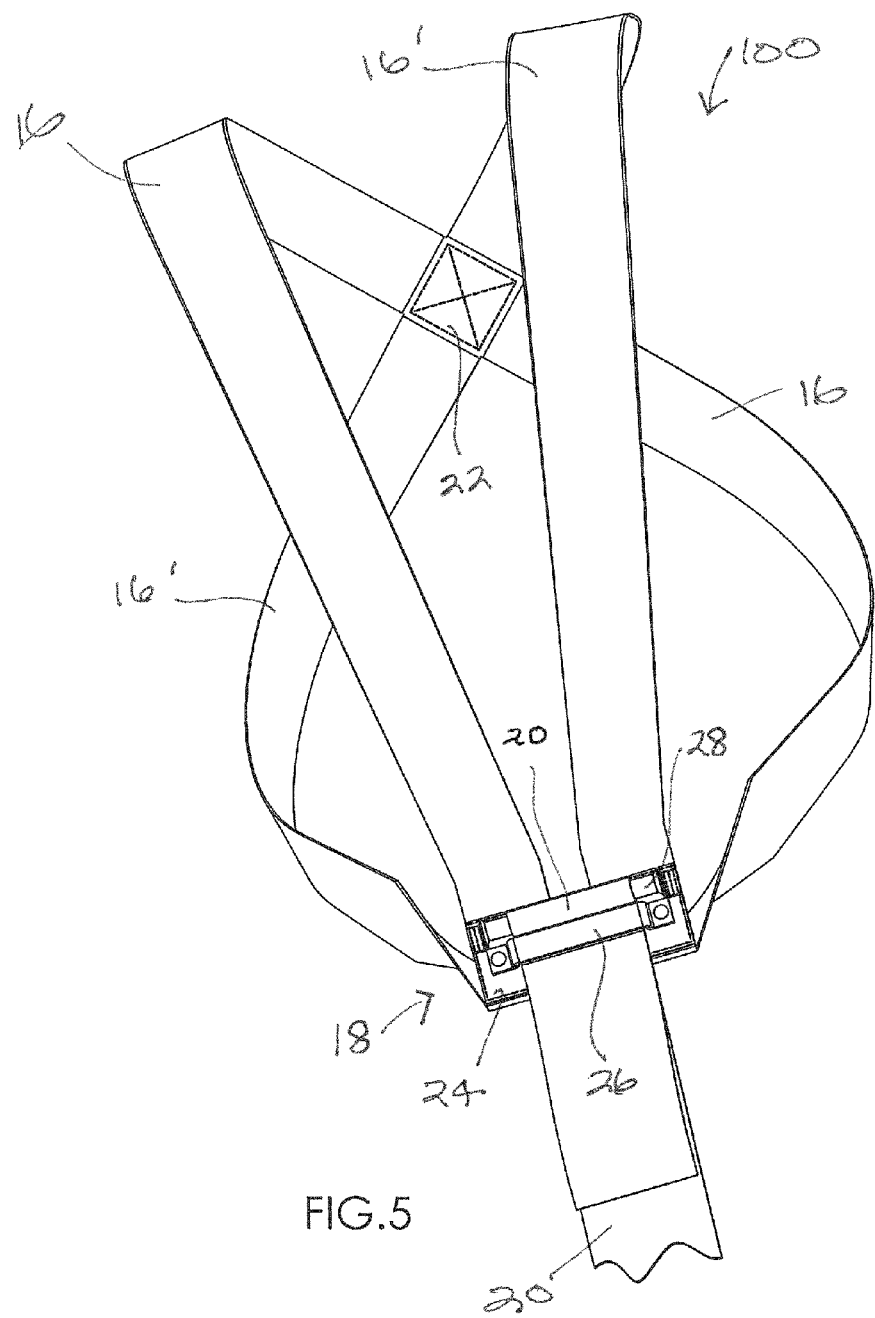
FIG. 5 is a schematic, front perspective view of the embodiment depicted in FIGS. 2-4, but without the person.

FIG. 5 shows the embodiment 100 in a front, top perspective view. From this Figure there is enough resolution to clearly see short buckle strap 24, fixed, rigid lower loop 26 and movable, flexible upper loop 28. Also, it is clear from this Figure that central lifter strap 20 passes first up through lower loop 26, then up behind, over and down partly around upper loop 28 before passing down through lower loop 26.

Figure 6:
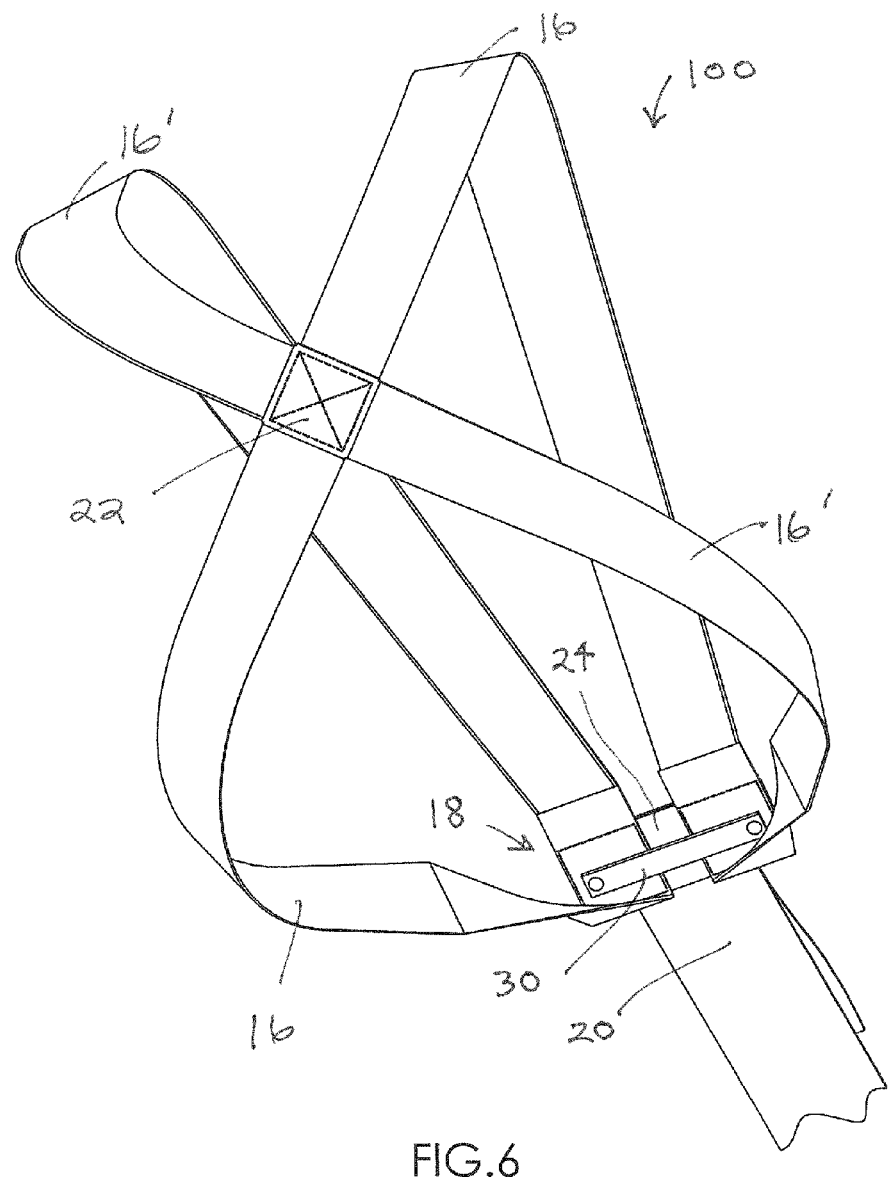
FIG. 6 is a back perspective view of the embodiment depicted in FIGS. 2-5.

FIG. 6 shows the rear view of FIG. 5, in which reinforcement bar 30, approximately co-extensive with fixed, rigid lower loop 26, but on the back sides of shoulder straps 16 and 16', is now clearly visible.

Shoulder straps 16 and 16' need not be present in the "x" connection embodiment. Instead, they may not be connected and each may exist separately at one side of the harness. Also, besides shoulder straps 16 and 16', the subject harness may be embodied in a belt for around the waist of a user. In such an embodiment, the front of the belt may serve as the buckle strap 24. In another embodiment, another garment, like an apron, may serve as the harness and buckle strap, with this structure integrated into the garment.

Figure 7:
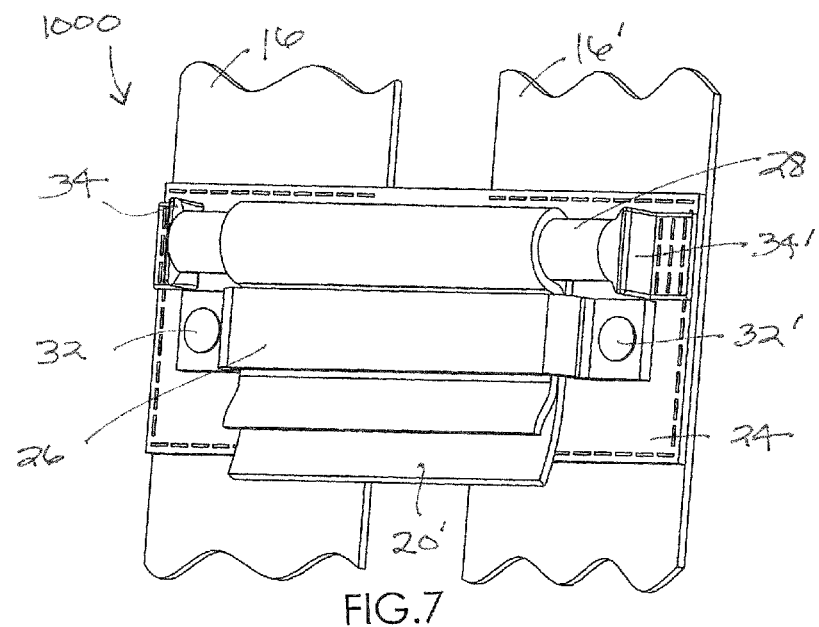
FIG. 7 is an enlarged, schematic, front perspective view of the central, front buckle of another embodiment of the disclosed technology.

FIG. 7 shows a front perspective view of another embodiment 1000 of the disclosed technology. In this enlarged Figure an abbreviated schematic portion of central lifter strap 20' is shown threaded twice through fixed, rigid lower loop 26 and once partly around movable, flexible upper loop 28. The fixed ends of lower loop 26 are secured to short buckle strap 24 by rivets 32 and 32'. Movable, flexible ends 34 and 34' of upper loop 28 are secured to short buckle strap 24 by several rows of sewing thread. Preferably, upper loop 28 is made of strong fabric which flexes and bends easily at both its ends.

If upper loop 28 is made of thicker, softer material, even with no load applied to central lifter strap 20', the bottom of upper loop 28 may lightly touch the top of lower loop 26. In this embodiment, the upper and lower loops still need to be spaced so that the central lifter strap 20' may be conveniently pushed between the loops to be threaded through the buckle.

Figure 8:
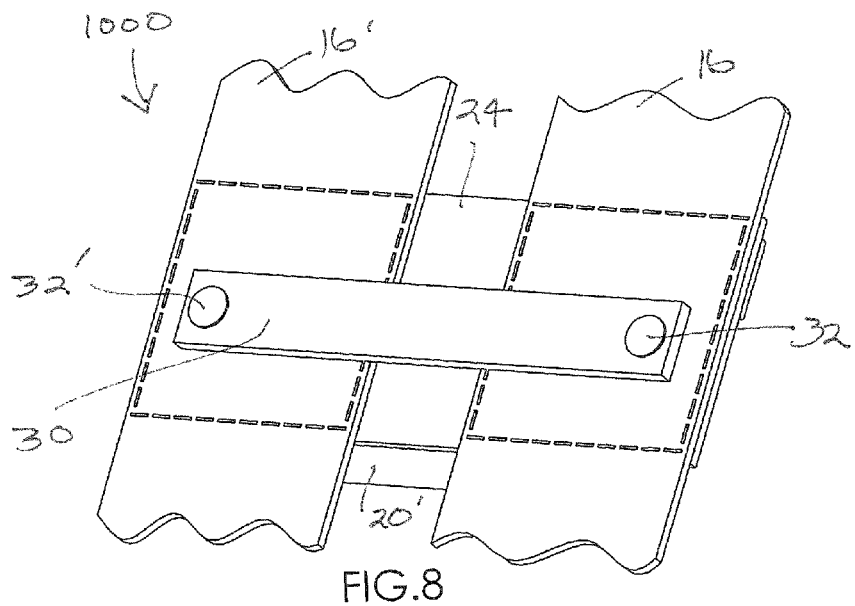
FIG. 8 is a back perspective view of the embodiment depicted in FIG. 7.

FIG. 8 shows a rear view of FIG. 7. From this Figure it is clear that rivets 32 and 32', which secure lower loop 26 to buckle strap 24, are the same rivets which secure optional reinforcement bar 30 to the back sides of shoulder straps 16 and 16'.

Figure 9:
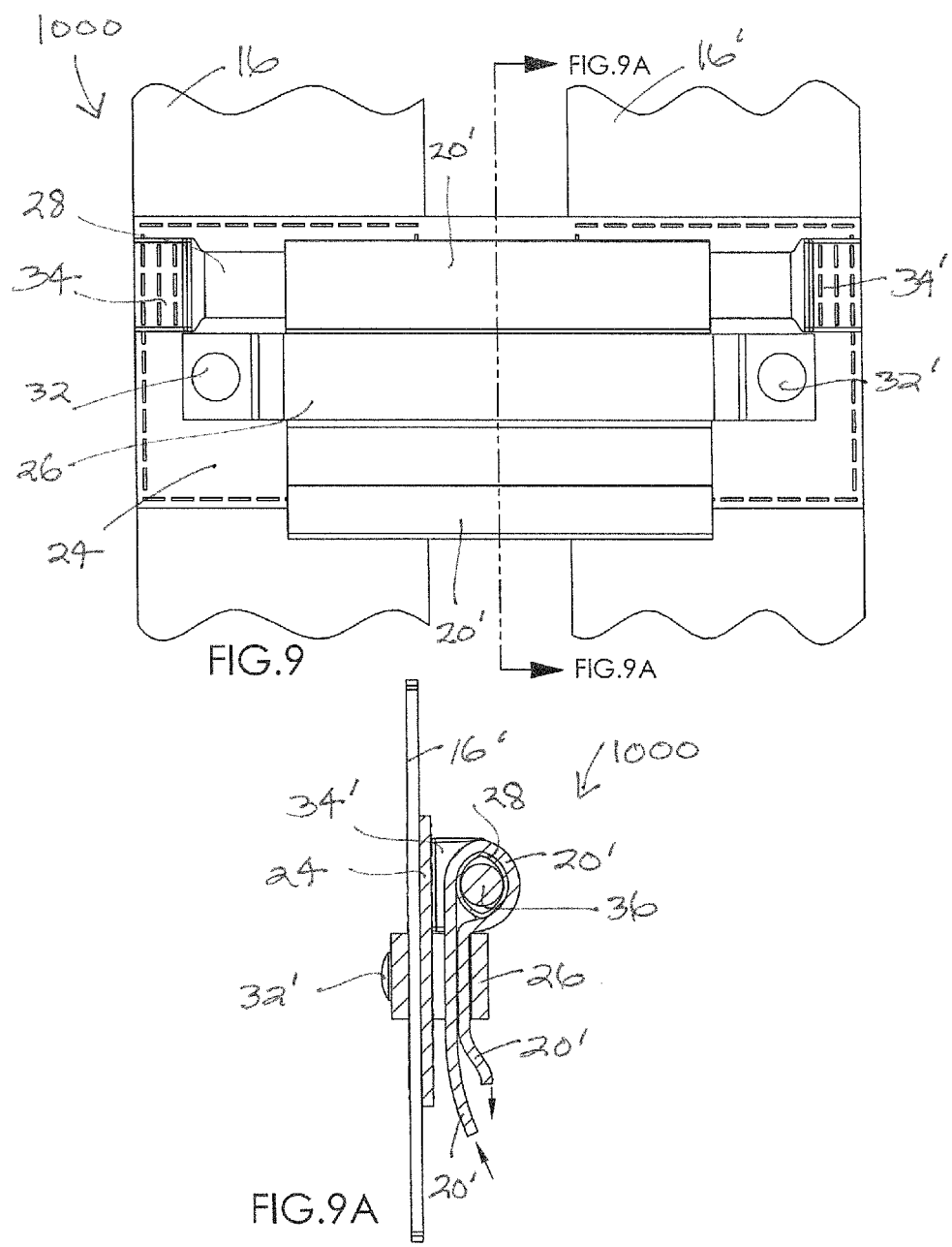
FIG. 9 is a further enlarged front view of the embodiment depicted in FIGS. 7 and 8.

FIG. 9 shows a front view of embodiment 1000. In this Figure the flexible ends 34 and 34' of upper loop 28 are clearly shown, stitched to the front of short buckle strap 24. FIG. 9A shows embodiment 1000 in side cross-section along the line 9A-9A in FIG. 9. In this Figure the reinforcement rod 36 within flexible upper loop 28 is shown for the first time. Preferably, rod 36 is made of a rigid and strong material like metal, wood or plastic. Also, from this Figure it is clear that upper loop 28 flexes and changes shape to become more oval than round to help pinch central lifter strap 20' against itself and the top edge of rigid lower loop 26 to secure strap 20' in the buckle. Also, because the ends 34 and 34' of upper loop 28 are also flexible, when a load is applied to lifter strap 20', upper loop 28 is pulled down, so it moves down relative to lower loop 26 to become closer to it, which also assists in the pinch pressure on lifter strap 20'.

Figure 10:
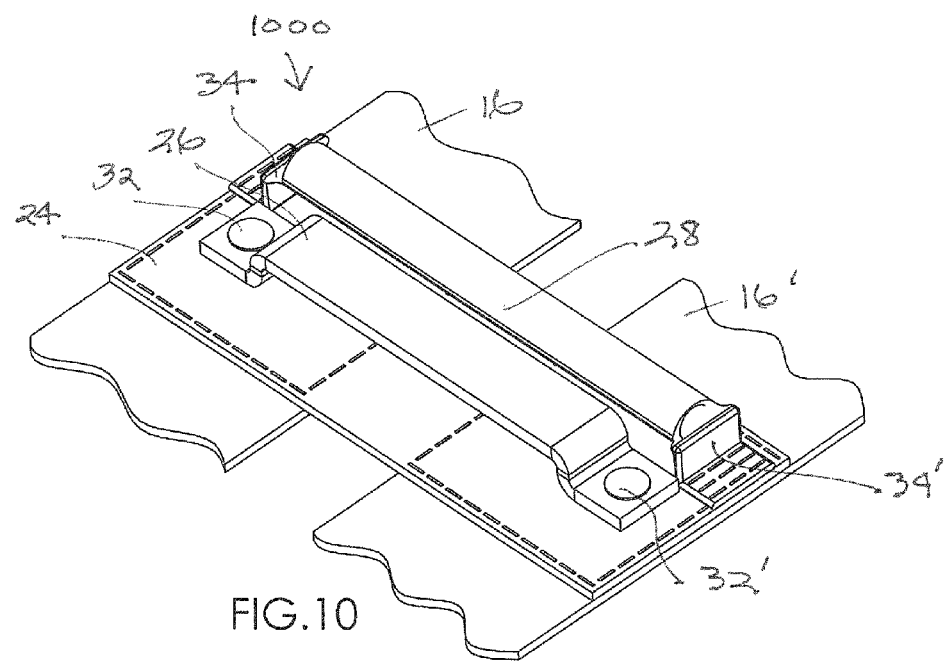
FIG. 10 is a side perspective view of the embodiment depicted in FIGS. 7-9A, but without the central lifter strap.

FIG. 10 shows embodiment 1000 in a side perspective view, without central lifter strap 20' present.

Figure 11:
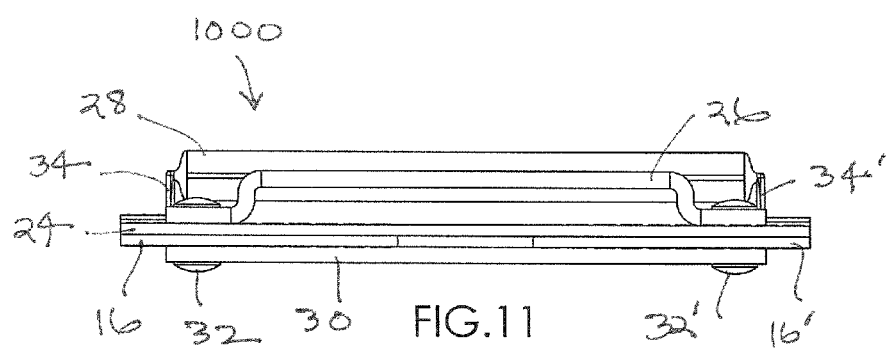
FIG. 11 is a bottom view of the embodiment depicted in FIG. 10.

FIG. 11 shows embodiment 1000 in a bottom view.

Figure 12:
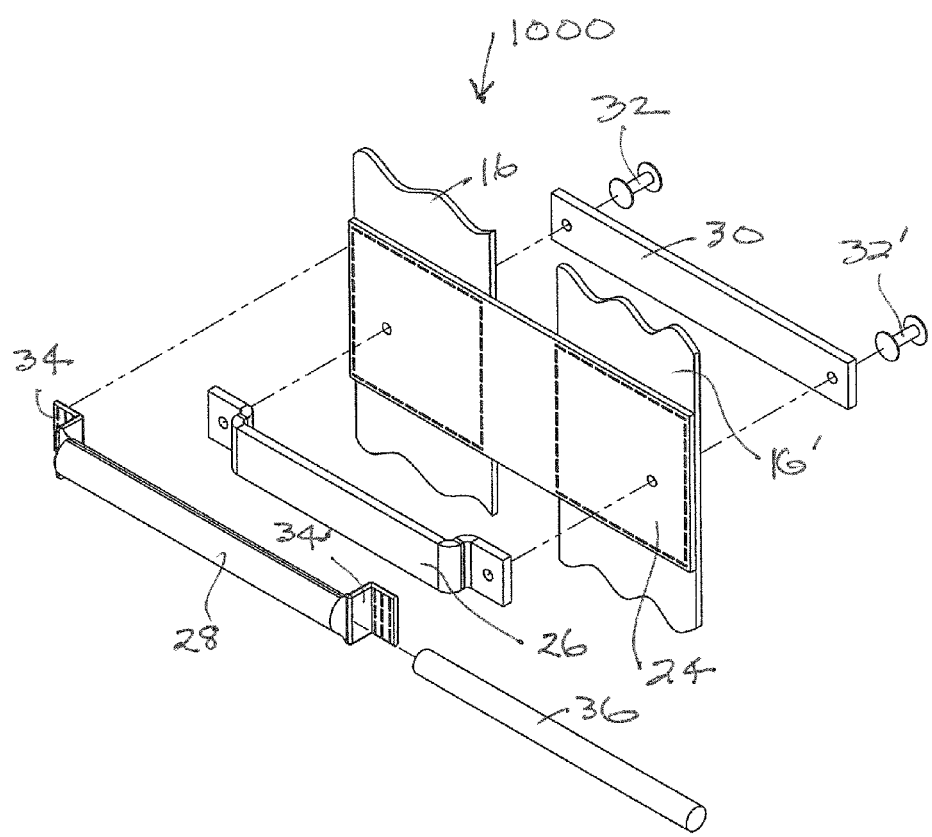
FIG. 12 is a side perspective exploded view of the embodiment depicted in FIGS. 7-11.

FIG. 12 shows embodiment 1000 in a side perspective exploded view.

Although this disclosed technology has been described above with reference to particular means, materials, and embodiments, it is to be understood that the disclosed technology is not limited to these disclosed particulars, but extends instead to all equivalents within the scope of the following claims.

I claim:
1. A buckle system for connection to a lifting harness, the buckle system comprising:

a buckle comprising a rear member, a rigid lower loop having two ends fixed to a front side of the rear member, and a flexible upper loop having two flexible ends connected to the front side of the rear member above said lower loop;

a lifter strap threaded through the buckle by extending around the upper loop and through the lower loop, for extending away from the buckle for placement under an object to be lifted;

wherein, when the lifter strap is pulled down from the buckle, the upper loop moves toward the lower loop by flexing of said flexible ends, and the lifter strap is pinched between said upper loop and said lower loop to restrain the lifter strap in the buckle.

2. The buckle system as in claim 1, wherein said rear member is a horizontal strap.

3. The buckle system as in claim 1, wherein said rear member comprises a horizontal strap and a reinforcement bar.

4. The buckle system as in claim 1, wherein said upper loop comprises a flexible fabric tube and a reinforcing rod in the flexible fabric tube.

5. The buckle system as in claim 1, wherein the upper loop and the lower loop are spaced-apart slightly more than the thickness of the lifter strap.

6. A strap lifter system comprising:
a first harness for being worn by a first user;
a first buckle connected to the first harness, the first buckle comprising a rear member, a rigid lower loop having two ends fixed to a front side of the rear member, and a flexible upper loop having two flexible ends connected to the front side of the rear member above said lower loop;
a lifter strap having a first end portion extending around the upper loop and threaded through the lower loop, for extending away from the first buckle for placement under an object to be lifted;
wherein, when the lifter strap is pulled down from the first buckle, the upper loop moves toward the lower loop by flexing of said flexible ends, and the lifter strap is pinched between said upper loop and said lower loop to restrain the lifter strap first end portion in the first buckle.

7. The strap lifter system as in claim 6, wherein said rear member is a horizontal strap.

8. The strap lifter system as in claim 6, wherein said rear member comprises a horizontal strap and a reinforcement bar.

9. The strap lifter system as in claim 6, wherein said upper loop comprises a flexible fabric tube and a reinforcing rod in the flexible fabric tube.

10. The strap lifter system as in claim 6, wherein said first harness is selected from the group consisting of shoulder harness, a waist belt, a garment.

11. The strap lifter system as in claim 6, wherein said first harness is a shoulder harness comprising two shoulder strap loops for left and right shoulders of the first user, wherein lower front portions of the shoulder strap loops are joined together by the first buckle.

12. The strap lifter system of claim 6, wherein the upper loop and the lower loop are spaced-apart slightly more than the thickness of the lifter strap.

13. A strap lifter system as in claim 6, further comprising a second harness for being worn by a second user, and a second buckle connected to the second harness, the second buckle comprising a rear member, a rigid lower loop having two ends fixed to a front side of the rear member of the second buckle, and a flexible upper loop having two flexible ends connected to the front side of the rear member of the second buckle above said lower loop of the second buckle;

wherein the lifter strap has a second end portion opposite said first end portion, and the second end portion extends around the upper loop of the second buckle and is threaded through the lower loop of the second buckle, for extending away from the second buckle for placement under said object to be lifted;

wherein, when the lifter strap is pulled down from the second buckle, the upper loop of the second buckle moves toward the lower loop of the second buckle, by flexing of said flexible ends of the upper loop of the second buckle, and the lifter strap second end portion is pinched between said upper loop and said lower loop of the second buckle to restrain the lifter strap second end portion in the second buckle.

14. The strap lifter system as in claim 13, wherein said rear member of the second buckle is a horizontal strap.

15. The strap lifter system as in claim 13, wherein said rear member of the second buckle comprises a horizontal strap and a reinforcement bar.

16. The strap lifter system as in claim 13, wherein said upper loop of the second buckle comprises a flexible fabric tube receiving a reinforcing rod.

17. The strap lifter system as in claim 13, wherein said second harness is selected from the group consisting of a shoulder harness, a waist belt, a garment.

18. A strap lifter system to be worn by two users, the system comprising:
a first harness for being worn by a first user and a second harness worn by a second user;
a first buckle connected to the first harness and a second buckle connected to the second harness, each of the first and second buckles comprising a rear member, a rigid lower loop having two ends fixed to a front side of the rear member, and a flexible upper loop having two flexible ends connected to the front side of the rear member above said lower loop;
a lifter strap having first and second end portions extending around the upper loop and threading through the lower loop of the first and second buckles, respectively, for extending between the first and second buckles for lifting and carrying an object on said lifter strap;
wherein, when the lifter strap is pulled down by weight of said object, the upper loops move toward the lower loops by flexing of said flexible ends, and the first and second end portions are pinched between said upper loop and said lower loop of the first and second buckle, respectively, to restrain the lifter strap in the first and second buckles.

19. The strap lifter system as in claim 18, wherein said first and second harnesses are selected from the group consisting of a shoulder harness, a waist belt, a garment.

20. The strap lifter system as in claim 18, wherein said flexible ends are fabric.

21. The strap lifter system as in claim 18, wherein said first and second harnesses are comprised of webbing straps sewn together and said first and second buckle rear members each comprise a webbing strap and a reinforcement bar.

22. The strap lifter system as in claim 21, wherein each of said first and second buckles comprises rivets extending between the reinforcement bar and the ends of the lower loop.

23. The strap lifter system as in claim 18, wherein the upper loop and the lower loop are spaced-apart slightly more than the thickness of the lifter strap.

24. A buckle system for use with a lifting harness, the buckle system comprising:
a buckle comprising a rear member, a rigid lower loop having two ends fixed to a front side of the rear member, and an upper loop comprising flexible ends connected to the front side of the rear member above said lower loop and a middle loop portion;

a lifter strap installed in the buckle and extending down away from the buckle for placement under an object to be lifted, wherein the lifter strap extends up through the lower loop, over the upper loop, and down through the lower loop, and wherein, when the lifter strap is pulled down from the buckle by weight of the object to be lifted, the lifter straps pulls the upper loop toward the lower loop by said flexible ends flexing, so that the lifter strap is pinched between said upper loop and said lower loop and restrained in the buckle.

25. The buckle system as in claim 24, wherein said rear member is a strap.

26. The buckle system as in claim 24, wherein said rear member comprises a strap and a reinforcement bar.

27. The buckle system as in claim 24, wherein said upper loop comprises a flexible fabric tube and the middle loop portion comprises a reinforcing rod in the flexible fabric tube.

28. The buckle system as in claim 24, wherein the upper loop and the lower loop are spaced-apart slightly more than the thickness of the lifter strap.

\* \* \* \* \*